United States Patent
Chang et al.

(10) Patent No.: US 7,315,695 B2
(45) Date of Patent: Jan. 1, 2008

(54) METHOD AND APPARATUS FOR DEFINING OPTICAL BROADBAND SERVICES ON AN OPTICAL COMMUNICATION NETWORK

(75) Inventors: Frank Yan Ho Chang, Ottawa (CA); Peter Timothy Green, Ottawa (CA)

(73) Assignee: Nortel Networks Ltd., St. Laurent, QC (CA)

( * ) Notice: Subject to any disclaimer, the term of this patent is extended or adjusted under 35 U.S.C. 154(b) by 548 days.

(21) Appl. No.: 10/769,209

(22) Filed: Jan. 30, 2004

(65) Prior Publication Data

US 2004/0184803 A1    Sep. 23, 2004

Related U.S. Application Data

(60) Provisional application No. 60/444,490, filed on Feb. 3, 2003.

(51) Int. Cl.
*H04B 10/00* (2006.01)
*H04J 14/00* (2006.01)

(52) U.S. Cl. .................................................. 398/67

(58) Field of Classification Search ............ 398/66–69
See application file for complete search history.

(56) References Cited

U.S. PATENT DOCUMENTS

| | | | |
|---|---|---|---|
| 2002/0196490 A1* | 12/2002 | Smith | 359/118 |
| 2003/0093485 A1* | 5/2003 | Dougall et al. | 709/208 |
| 2004/0208587 A1* | 10/2004 | Chang et al. | 398/100 |

\* cited by examiner

*Primary Examiner*—Leslie Pascal
(74) *Attorney, Agent, or Firm*—John C. Gorecki (57) ABSTRACT

A method and apparatus for defining optical broadband services on an optical communication network enables broadband optical services to be built from basic service building blocks. According to an embodiment, a service definition software platform includes the ability to specify multiple aspects of optical broadband service to enable the optical broadband services to be defined according to optical service building blocks, gathered into service offering sets, and grouped into service groupings. Individual service offerings can then be built from the basic building blocks and from the service offering sets. By enabling the services to be broken down into building blocks that can then be used to define service sets and groups of services, service providers are more effectively able to market optical broadband services as network products. Additionally, the ability to group particular types of services together enables new types of optical broadband services to be created and offered.

17 Claims, 3 Drawing Sheets

METHOD AND APPARATUS FOR DEFINING OPTICAL BROADBAND SERVICES ON AN OPTICAL COMMUNICATION NETWORK

BACKGROUND

1. Field

This application relates to communication networks and, more particularly, to a method and apparatus for defining optical broadband services on an optical communication network.

2. Description of the Related Art

Data communication networks may include various computers, servers, hubs, switches, nodes, routers, proxies, and other devices coupled to and configured to pass data to one another. These devices will be referred to herein as "network elements." The network elements are interconnected by communication links over which data may be passed to effect a transfer of information through the network. These communication links may be formed using many technologies, such as copper wires, wireless transmissions, and optical fibers.

One form of optical communication is commonly referred to as Wavelength Division Multiplexing (WDM) which enables multiple different wavelengths (λs) to be used to carry different signals on the same optical fiber. There are currently two different types of WDM, Coarse Wavelength Division Multiplexing (CWDM) and Dense Wavelength Division Multiplexing (DWDM).

Initially, optical transport technologies were only used on the backbone of the network for long haul optical transport. The emergence of DWDM optical platforms in metropolitan areas, however, has enabled enterprises to be directly connected to optical broadband services. Optical broadband services are circuit-based services in which bandwidth is reserved and dedicated to a single customer. Hence, statistical multiplexing and packet/frame switching are not required on the service. Optical broadband service may include point-to-point circuit-based service or point-to-multipoint service. Current optical broadband services typically have line rates of 100 Mbps and higher, which makes them desirable for many high bandwidth applications, such as for connectivity between different enterprise sites, for access to off-site data storage, and for many other types of high bandwidth applications.

One fundamental unit of an optical broadband service is referred to herein as a channel. A channel is typically defined as a bi-directional entity, although unidirectional entities may be used as well. Channels can be transported in many ways (i.e. natively on wavelengths, subrate multiplexed on wavelengths, STS-n within SONET/SDH payload, etc) depending on the particular network implementation.

As optical networks have developed, and the protocols available to be carried on the optical infrastructure have developed, a variety of features have become available in connection with optical broadband services. For example, the set of protocols supported on a given optical broadband service can vary widely depending on the service provider and how the service is to be used. Unfortunately, there is no available mechanism to accurately describe and keep track of the available services, which makes it difficult to offer these services to enterprise customers.

SUMMARY OF THE DISCLOSURE

Accordingly, it would be advantageous to provide a method and apparatus for defining optical broadband services on an optical communication network. According to an embodiment of the invention, a service definition software platform includes the ability to specify multiple aspects of optical broadband service, to enable the optical broadband services to be classified according to optical service building blocks, gathered into service offering sets, and grouped into service groupings. By enabling the services to be broken down into building blocks that can then be used to define service sets and groups of services, service providers are more effectively able to market optical broadband services as network products. Additionally, the ability to group particular types of services together enables new types of optical broadband services to be created and offered.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, optical broadband services may be provided on an optical communication network by enabling service providers to define the optical broadband service building blocks and create new service offerings from the optical broadband service building blocks. According to an embodiment of the invention, a service definition software platform includes the ability to specify multiple aspects of optical broadband service to enable the optical broadband services to be classified according to optical service building blocks, gathered into service offering sets, and grouped into service groupings. By enabling the services to be broken down into building blocks that can then be used to define service sets and groups of services, service providers are more effectively able to market optical broadband services as network products. Additionally, the ability to group particular types of services together enables new types of optical broadband services to be created and offered.

There are many different reasons a customer may want to subscribe to optical broadband services. Several illustrative examples include broadband access, the ability to outsource remote storage backup, to provide multi-node LAN connectivity, or to do a combination of these functions. Depending on the reason for having broadband access, the type of connection and the type of interface to the connection may need to be different. According to an embodiment of the invention, a service definition software platform is able to define available resources for a particular customer by maintaining a database of available network resources, build a service set from the basic building blocks for the customer, maintain a record of services allocated to the particular customer, and update the services as required.

In the following description, the first part of the description will focus on the basic building blocks and how these building blocks may be used to defined service sets. Then, several example service sets will be described. The invention is not limited to the particular described service building blocks or example service sets as other types of building blocks and numerous other combinations of service building blocks may be created to form numerous other service sets. The invention is thus not limited to the particular building blocks or service sets described below.

Additionally, in the following description, the service definition software platform will be described as maintaining definitions of the available building blocks, the building blocks available on the particular networks, service sets to be made available to customers, service groupings which are groups of available service sets, and particular services subscribed to and to be provided to particular customers. The invention is not limited to this example as other service platforms may be defined as well.

Depending on the particular network implementation, one or more of the service components may be available in a particular part of the network. Additionally, only particular attributes may be available on that part of the network. The basic building blocks may be combined with network information to create service offering sets, which may then be provided to particular customers. Optionally, the service offering sets may be combined to create service groups. The service definition software platform, according to one embodiment of the invention, enables this information to be maintained and managed from a central location to enable optical broadband services to be offered to end customers. Additionally, the ability to describe and manage the services in a granular fashion enables additional types of services to be defined that otherwise would not be possible to define and offer on the optical network.

Figure 1:
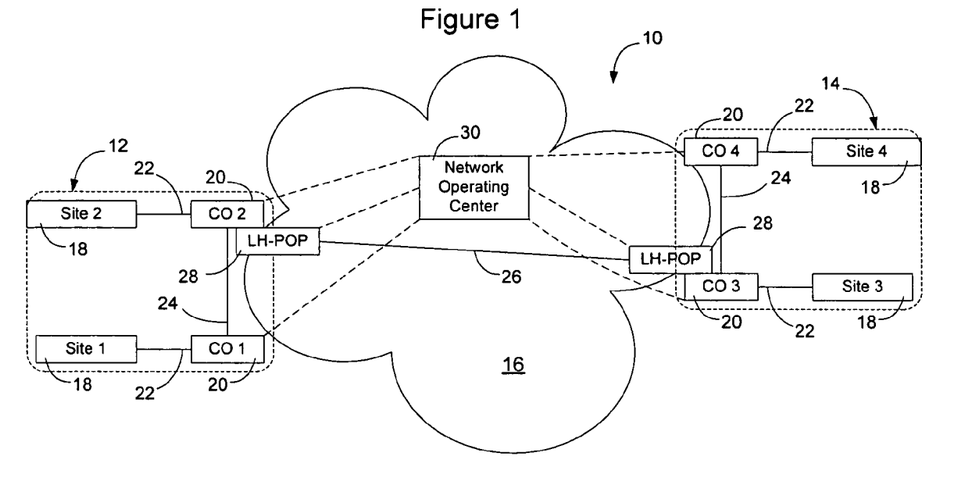
FIG. 1 is a functional block diagram of an example network illustrating the provision of optical services between several customer premises.

FIG. 1 illustrates a functional block diagram of an example network on which optical broadband services may be provisioned between several customer premises. Specifically, as shown in FIG. 1, a network 10 includes a first metropolitan area 12 metropolitan area 14. An inter-metropolitan area transport network 16 connects the two metropolitan areas. The transport network extending between metropolitan areas will be referred to herein as the long haul network 16.

A customer may have premises within one metropolitan area or may include premises in several different metropolitan areas. In the example illustrated in FIG. 1, the customer has four different sites 18 to be interconnected by optical broadband services. Any number of sites may be included and the invention is not limited to this particular example.

Customer sites 18 are connected to a central office 20 in the metropolitan area. For example, site 1 may be connected to central office 1, site 2 may be connected to central office 2, etc. Additionally, multiple sites may be connected to the same central office, although this is not illustrated in FIG. 1. Links 22 between the customer sites 18 and associated central office 20 will be referred to herein as local channels.

Central offices within a metropolitan area may be interconnected to allow optical services to be provided within the metropolitan area. The links interconnecting central offices or wiring centers within a metropolitan area will be referred to herein as Inter-Office Facilities (IOF) channels 24. In the illustrated example, the link 24 between CO1 and CO2 would be an IOF channel, and the link 24 between CO3 and CO4 would be an IOF channel. In an actual network there may be many more wiring centers and central offices and a concomitant plethora of IOF channels within a given metropolitan area.

Metropolitan areas may be directly connected to each other or, as illustrated, may be connected by one or more long haul networks 16. Links that extend through the long haul network to interconnect metropolitan areas will be referred to herein as long haul links 26. Typically, the links will extend from a long haul point of presence 28 on one metropolitan area to a long haul point of presence 28 on the other metropolitan area. For example, in the illustrated example, a long haul link 26 extends from a LH POP 28 at metropolitan area 14 to a LH POP 28 in metropolitan area 16. The links may be direct as illustrated or several long haul links may be required to interconnect distant metropolitan areas.

The network elements may be connected to a network operating center 30 responsible for provisioning circuits to customers. The network operating center may be centrally located, may be associated with one or more of the metropolitan areas, may be associated with a particular long haul Inter Exchange Carrier, or may be a distributed process on the network. The invention is not limited to where on the network the control mechanism is located. According to an embodiment of the invention, a service definition software platform is deployed on the network to enable services to be defined and otherwise organized for consumption by end customers. The service definition software platform may be implemented in the network operating center 30, may be implemented in the network elements forming the network, elsewhere on the network, or may be distributed on more than one network element on the network. In one embodiment of the invention, the service definition software platform is centrally located and communicates with the network elements using a conventional network element control and management protocol. Examples of such protocols include User to Network Interface (UNI), Network to Network Interface (NNI), Simple Network Management Protocol (SNMF), although the invention is not limited to an embodiment that uses one or more of these protocols.

Figure 2:
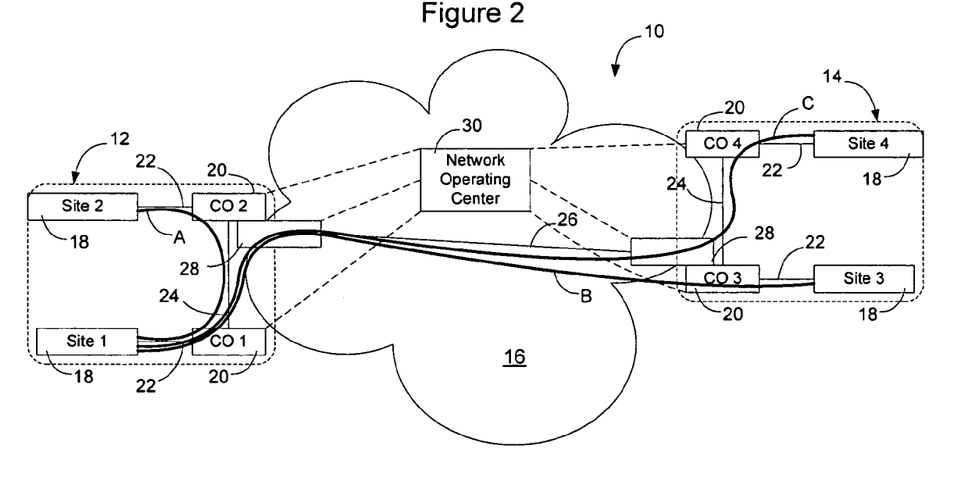
FIG. 2 is a functional block diagram illustrating several optical channels provisioned through the example network of FIG. 1.

FIG. 2 illustrates several connections on the network forming an optical broadband service for the subscriber between the several subscriber sites. In the example illustrated in FIG. 2, the optical service extends between site 1 to each of the other sites in what is commonly referred to as a hub-and-spoke topology. Specifically, in this example, the optical service includes a component A extending between sites 1 and 2, a component B extending between sites 1 and 3, and a component C extending between sites 1 and 4. These components are illustrated in greater detail in FIG. 3, which will be described below after introduction of the basic building blocks of the optical broadband service.

Service Building Blocks

Figure 3:
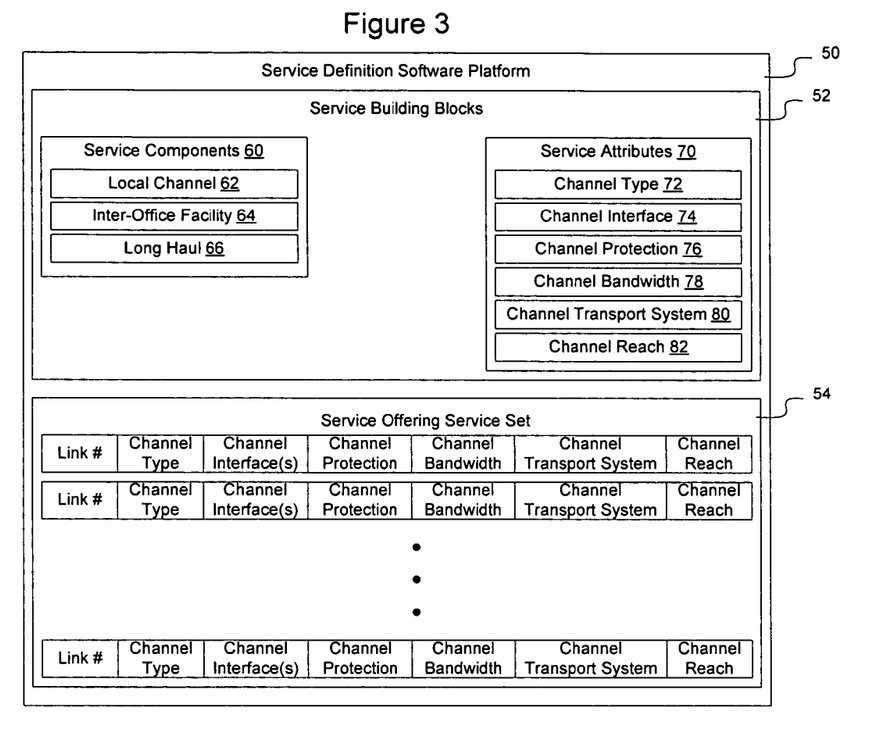
FIG. 3 is a functional block diagram illustrating the example service offering of FIG. 2 in greater detail.

Service building blocks are the fundamental services that may be provided to end customers. FIG. 3 illustrates an embodiment of a service definition software platform that may be used to implement an embodiment of the invention.

Figure 4:
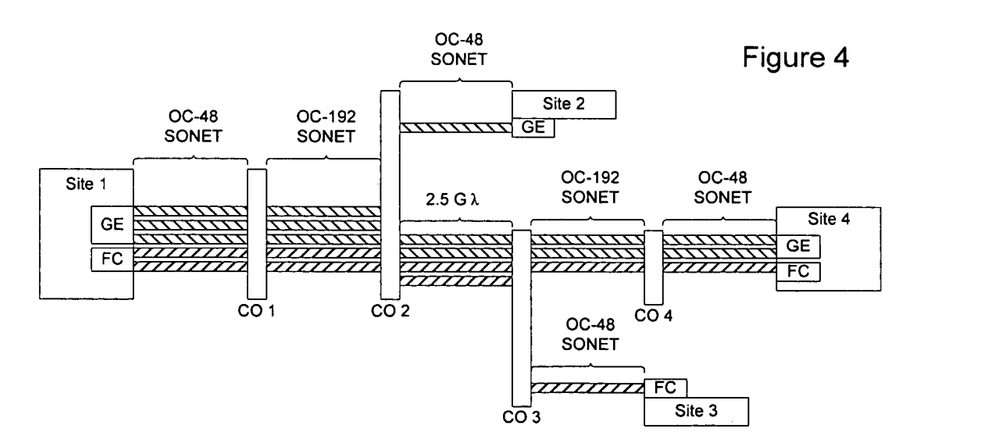
FIG. 4 is a functional block diagram of a service definition software platform according to an embodiment of the invention.

In the embodiment illustrated in FIG. 3, the service definition software platform 50 includes service definition building blocks 52 which may be used to define services on the services definition software platform according to an embodiment of the invention. As shown in FIG. 4, service building blocks 52 may include service components 60 and service attributes 70. The service definition software platform may also include service offering service sets 54 which are particular services built from the service building blocks 52. The invention is not limited to this particular implementation, however, as other embodiments may be created as well.

Service Components

Service components 60 generally relate to the particular links or resources that are used to provide part of the optical communication service. There are many possible different types of service components. In the embodiments discussed herein, three particular service components are discussed: local channel service components 62, InterOffice Facility (IOF) service components 64, and long haul service components 66. The invention is not limited to an embodiment that uses all three of these components or only these particular components to provide service as other logical demarcations may be possible as well. The particular attributes of the service components will be described below in connection with the service attributes section.

Local Channels 62 are offered by local service providers. In the example network illustrated in FIGS. 1-2, the local channels are identified as links 22. A local channel 62 provides a point-to-point broadband channel between a customer location and a service provider's wire center or central office. Traffic can be handed off to IOF channel 64 or other services at the wire center. A wide range of access technologies is available for local channel services. Optical repeater (e.g. FOIRL) over fiber, CWDM, DWDM and SONET can all be used, as discussed in greater detail below.

IOF (InterOffice Facility) Channels 64 are offered by local service providers. In the example network illustrated in FIGS. 1-2, the IOF channels are identified as links 24. An IOF channel provides a point-to-point broadband channel between two wire centers within a metro area. The demarcation points for the IOF channels are typically the optical system handoff points. Therefore, a broadband channel traversing multiple metro IOF systems is made up of multiple IOF channels, one for each system.

LH (Long Haul) channels 66 are offered by long distance service providers, also referred to as inter-exchange carriers. In the example network illustrated in FIGS. 1-2, the long haul channel is identified as link 26. Any inter-metropolitan area channels may be considered a long haul channel. A LH channel provides a point-to-point broadband channel between two long haul points of presence or wire centers. The demarcation points of a long haul channel generally will be the source and destination handoff points. Where more than one long distance carrier is involved to provide the long haul channel, the long haul channel may optionally be considered as two or more interconnected long haul channels.

Service Attributes

Each service component will carry a number of service channels. For example, a local channel service component may carry 5 logical channels, each of which may be allocated to a different subscriber. Since each subscriber may desire a different type of service over that service component, the channels within the service component are each provided with service attributes 70. Service attributes 70 are used to specify the properties of the channels as part of the service offerings. A number of service attributes may be defined, such as channel type 72, channel interfaces 74, channel protection 76, channel bandwidth 78, channel transport system 80, and channel reach 82. Other service attributes may be defined as well and the invention is not limited to these several particular service attributes.

Channel Type

One of the attributes 70 of a channel is the channel type 72. The channel type, in this context, is related to the service components discussed above, except that a given channel may span multiple segments each of which may be carried over a different channel type. Including the channel type as an attribute of the channel enables the channel to be defined in terms of the service component on which it will be carried. For example, if a channel spans a local channel, an IOF channel, and another local channel, the channel may be broken into three segments, and each segment provided with a channel type attribute. This allows the service definition software platform to maintain information about which segments are being carried on which types of service components.

Channel Interface

The channel interface attribute 74 specifies the protocol and line rate of the channel on the service component. There are numerous different protocols that may be used on the channels. Several examples of conventional optical protocols and line rates that may be used include:

Synchronous Optical Network (SONET) OC-n and OC-nc where n=3, 12, 48, 192

SDH STM-n and STM-nc where n=1, 4, 16, 64

SDI "D1 Video"—270 Mbps

DV6000—2.38 Gbps

PrismaDT—2.488 Gbps

HDTV 29 Hz/30 Hz-1.483/1.4835 Gbps

Fast Ethernet—125 Mbps

Gigabit Ethernet—1.25 Gbps, 10 Gbps

Fiber Distributed Data Interface (FDDI)—125 Mbps

Fibre Channel—133 Mbps, 266 Mbps, 1.062 Gbps, 2.125 Gbps

FICON—1.062 Gbps

FICON Express—2.125 Gbps

ESCON—200 Mbps

ISC—1.062 Gbps; ISC III—2.125 Gbps

Other physical specifications include fiber types (single mode fiber, multi-mode fiber,), connector types, optical reach, etc.

Channel Interfaces may be considered to be of two basic types: customer channel interfaces and central office channel interfaces. Customer channel interfaces specify the interfaces facing end user equipment, whereas central office channel interfaces specify the interfaces within the central office for handoffs between services or handoffs between service components. Channel interfaces specify the protocols and line rates of each service component. In other words, each local channel, IOF channel and long haul channel is terminated by two optical channel interfaces, one at each end.

The interfaces on a given channel can be symmetrical or asymmetrical. A channel is said to have a pair of symmetrical channel interfaces when the two channel interfaces are identical. Similarly, a channel is said to have a pair of asymmetrical channel interfaces when the two channel interfaces are not identical. There are three basic kinds of interface asymmetry: line rate asymmetry, spectral asymmetry, and protocol asymmetry. The types of interface asymmetry are not mutually exclusive, so that it is possible to have one or more asymmetries for a single channel.

Line rate asymmetry indicates a condition where the line rate of one channel interface is higher than the other as a result of multiplexing. For instance, a channel may have an OC-3 customer interface at one end and an OC-48 channel interface at the other end. Spectral asymmetry could occur on a CWDM/DWDM system when one channel interface is in the form of individual wavelength and another channel interface is in the form of a band of wavelengths. Protocol asymmetry is introduced in systems that support some type of protocol adaptation or encapsulation. One notable example is Generic Framing Procedure (GFP). For instance, a channel configured with protocol asymmetry may include a Fibre Channel customer interface at one end and an OC-48 interface at the other end. Interface asymmetry may provide a very cost effective way to carry multiple channels through the network by enabling handoff costs to be reduced between systems or service components.

Channel Protection

The channel protection attribute 76 allows the channel to be specified as being optically protected or unprotected. Route diversity, separate cable sheaths, and separate building entrances can be added as optional features and specified using this attribute.

Channel Protection actually includes a number of service attributes which may determine the overall channel availability and reliability. Several attributes of channel protection include protection classes (unprotected, deterministic, statistical); protection scope (individual channel protection or end-to-end protection); the number of connections from the customer site to the central offices (single homing vs. multi-homing); route diversity; and building entrance diversity. A protection strategy for any particular channel may include some or all of these attributes. These protection attributes may be specified in the service definition software platform and attributed to one or more channels on the network.

Protection classes enable the channel to be specified as protected or unprotected, and if protected enable the protection to be specified as deterministic or statistical. Specifically, each channel can either be unprotected or protected. An unprotected channel will not be recovered by any automatic protection switching mechanism, although an unprotected channel will still be recovered—just not by an automatic protection switching mechanism.

If the channel is to be protected, there are two main ways to do so: deterministic protection and statistical protection. In deterministic protection, the protection path and protection bandwidth is predetermined. The availability of the channel is deterministic and guaranteed. Protection switching time can be very brief (in 50-100 ms range) because of the deterministic nature. In statistical protection, the protection path and protection bandwidth is determined upon network failure detection. The availability of the channel is therefore less deterministic. Protection switching time could vary a great deal and it would depend on the implementation. Different grades of statistical protection may be offered as different Classes of Service (CoS).

The protection scope aspect of the channel protection attribute enables channel protection to be specified. Since an end-to-end broadband service may include more than one service component, the channel may be protected in a number of different ways. For example, the service components of the channel may be individually protected without nodal protection, the service components may be individually protected with nodal protection, or the channel may be provided with end-to-end protection. Numerous different protection schemes may be specified using this channel attribute and the invention is not limited to the particular manner in which channel protection is specified.

The homing aspect of the channel protection attribute enables the channels to be set up from the customer premises to one or more wire centers or central offices. Each connection between the customer premises may still be protected regardless of the homing selection.

The route diversity aspect of the channel protection attribute enables the channel to be specified to include two diversely routed (non-overlapping) physical paths between two points on the network. Route diversity is different than channel protection, since a protected channel can be transported over an optical system without route diversity. Local route diversity ensures the access fibers from a customer premise to the first wire center are routed diversely. IOF route diversity, on the other hand, ensures the IOF portion of the facility to be diversely routed. End-to-end route diversity, as its name suggests, offers end-to-end route diversity where there is no overlapping at any span.

Route diversity does not guarantee separate building entrances; especially at customer premises. The building entrance diversity aspect of the channel protection attribute enables this aspect of the service to be specified to ensure that there are separate building entrances at the customer premises.

Channel Bandwidth

The channel bandwidth attribute 78 specifies the actual throughput of the channel which may be equal to or less than the line rate of the channel interface. There are generally two classes of channel bandwidth: full rate channel and subrate channel. The service definition software platform uses the bandwidth attribute to control the throughput on the channel and to allow the service provider(s) to sell particular amounts of connectivity over a given channel to a particular subscriber. The overall channel throughput will be equal to the lowest bandwidth on the slowest link on the channel.

A full rate channel is a channel in which the maximum channel throughput matches the channel interface line rate. A subrate channel is a channel in which the maximum channel throughput is capped at a rate lower than the channel interface line rate. Subrate channels are sometime known as rate-limited channels.

Subrate channels may also be specified as fixed or flexible. Fixed subrate channels do not allow any automatic variation in the channel bandwidth once the service becomes active. Any change on the channel bandwidth is treated as a service request. Flexible subrate channels, by contrast, allow the channel bandwidth to throttle within a stated range.

Subrate channel bandwidth can be offered at different granularities. With contiguous concatenation, the subrate channels have a choice of STS-nc payload where n=3, 12, 24, 48, 192. Virtual concatenation offers a much more granular solution. Subrate channel with virtual concatenation can use VT1.5, STS-1 or STS-3c as the base units. The channel bandwidth may thus be any multiple of the base units.

Channel Transport

The channel transport system attribute 80 specifies the actual network implementation (i.e. C/DWDM, SONET, GFP, VCAT). A channel in an optical broadband service can be transported in a number of methods depending on the underlying network architectures and technology options. For instance, a full rate Fibre Channel can be transported natively on a 1.25 G λ with a CWDM or DWDM system. The same full rate channel can also be mapped into STS- 3c-7 and transported on a 2.5 G λ. Another alternative is to transport the same STS-3c-7 channel with STS-48 capacity. These various transport methods (i.e. 1.25 G λ, 2.5 G λ and STS-48) are defined as channel transport systems. The service definition software platform uses the channel transport system attribute to keep track of the particular network implementation on the segment of the channel.

The use of channel transport systems as a service attribute provides a way for service providers to incorporate different network cost structures (due to different network technologies) into service descriptions and service pricing. Additionally, the use of channel transport systems as a service attribute enables an optical broadband service to be offered as a service bundle that includes multiple channels.

For instance, a customer can subscribe to an optical broadband service with 1.25 G λ as the channel transport system. The customer can then pay for a single ESCON channel over this 1.25 G λ channel transport system initially. As the demand grows, more ESCON channels can be added to this channel transport system.

Channel Reach

The channel reach attribute 82 defines how far apart (in miles or km) two service demarcation points may be placed. This attribute enables the channel reach to be specified where the channel reach is of a limited range. For example, a number of protocols (such as Fibre Channel and ESCON) currently have an intrinsic reach limitation due to timing requirements. This attribute allows the reach of the service to be specified when necessary.

The following table summarizes the service attributes that may be specified using the service definition software platform according to an embodiment of the invention. Although several attributes have been described herein, the invention is not limited to these particular attributes as other attributes may be specified additionally or instead of those discussed herein.

| | |
|---|---|
| Channel Types | Local Channel, IOF Channel, LH Channel |
| Channel Interfaces | Protocols, Line Rates, other Physical Specs |
| | Customer Channel Interfaces, CO Channel Interfaces |
| | Symmetrical Interfaces, Asymmetrical Interfaces |
| Channel Protection | Protection Classes: Deterministic vs. Statistical |
| | Protection Scope |
| | Single Homing vs. Dual Homing |
| | Route Diversity |
| | Building Entrance Diversity |
| Channel Bandwidth | Full Rate vs. Subrate |
| | Subrate: fixed vs. flexible |
| | Subrate: bandwidth granularity VT1.5, STS-1, STS-3c |
| | End-to-end Channel Bandwidth |
| Channel Transport Systems | 1.25 G λ, 2.5 G λ, on C/DWDM |
| | STS-n(c), STS-1-nv, STS-3c-nv on OC-N |
| Channel Reach | Km or miles |

Service Offering Service Set

Once the basic service building blocks are defined, the software platform enables service offerings to be defined from the basic building blocks. These service offerings may be considered a set of features common that may be desirable to one or more customers, to enable customers to more readily select an appropriate type of broadband optical service for a particular implementation. Since any of the above attributes may be selected to form a service set, an exhaustive listing of all possible combinations will be omitted. To help understand how the service offering service set feature operates, several examples are set forth below.

EXAMPLE 1

Full Rate Fibre Channel Access Service

This particular service offering includes a single service component. The service uses 1.25 G wavelength as the channel transport system through a CWDM or DWDM system. The Fibre Channel (FC-100) interface is used at both Customer Channel Interface and CO Channel Interface. It is a full rate service where the Fibre Channel is transported natively across the system. The channel is protected optically with a diversely routed protection path but it is not protected against CO nodal failure. A potential application is for enterprise to backup their data to an outsourced storage facility co-located with the serving wire center.

Each optical broadband service offering can be described systematically by using the service components and service attributes introduced earlier. This "recipe" approach will help eliminate any ambiguity and make communication that much more effective. The following table summarizes the features of this service offering:

EXAMPLE # 1

Full Rate Fibre Channel Access Service

| Service Attributes | Service Component 1 |
|---|---|
| Channel Types | Local Channel |
| Channel Interfaces | |
| Customer Channel Interface | FC-100 |
| CO Channel Interface | FC-100 |
| Interface Symmetry | Symmetrical |
| Channel Protection | |
| Protection Classes | Optically protected; deterministic |
| Protection Scope | Local Channel Protection |
| Homing | Single Homing |
| Route Diversity | Local Channel Route Diversity |
| Building Entrance | Separate Customer Entrances; Separate CO Entrances |
| Channel Bandwidth | |
| Per Channel | Full Rate |
| End-to-End | Full Rate |
| Channel Transport Systems | |
| Per Channel | 1.25 G λ C/DWDM |
| Channel Reach | |
| End-to-End | Up to 300 miles |

EXAMPLE 2

Full Rate Fibre Channel Extended Access Service

This service offering can be considered as an extension to the previous one in a sense that it is still an access service but it is extended geographically to beyond just the customer's serving wire center. This is enabled by including an additional service component: an IOF Channel.

The service uses 1.25 G wavelengths as the channel transport systems through CWDM or DWDM systems for both the Local Channel and IOF Channel. The Fibre Channel (FC-100) interfaces are used as both Customer Channel Interface and CO Channel Interfaces. It is a full rate service where the Fibre Channel is transported natively across the systems. The Local and IOF Channel are protected optically but separately. Protection paths are diversely routed but the channel is not protected against CO nodal failure. Only one IOF Channel is assumed in this example. The following table summarizes the features of this service offering:

EXAMPLE # 2

Full Rate Fibre Channel Extended Access Service

| Service Attributes | Service Component 1 | Service Component 2 |
|---|---|---|
| Channel Types | Local Channel | IOF Channel |
| Channel Interfaces | | |
| Customer Channel Interface | FC-100 | FC-100 |
| CO Channel Interface | FC-100 | FC-100 |
| Interface Symmetry | Symmetrical | Symmetrical |
| Channel Protection | | |
| Protection Classes | Optically protected; deterministic | Optically protected; deterministic |
| Protection Scope | Local Channel Protection | IOF Channel Protection |
| Homing | Single Homing | n/a |
| Route Diversity | Local Channel Route Diversity | IOF Route Diversity |
| Building Entrance | Separate Customer Entrances; Separate CO Entrances | Separate CO Entrances |
| Channel Bandwidth | | |
| Per Channel End-to-End | Full Rate Full Rate | Full Rate |
| Channel Transport Systems | | |
| Per Channel | 1.25 G λ C/DWDM | 1.25 G λ C/DWDM |
| Channel Reach | | |
| End-to-End | Up to 300 miles | |

EXAMPLE 3

Full Rate Fibre Channel Intra-Metropolitan Area Service (a)

Example 3 provides an example of an end-to-end service where both service demarcation points reside at customer premises. This particular intra-metropolitan area service offering includes three service components: 2×Local Channels and 1×IOF Channel.

The service also includes more than one kind of channel transport systems. The first Local Channel uses 1.25 G wavelength via a C/DWDM system as the channel transport system. The FC-100 channel is transported natively. The IOF Channel uses a 2.5 G wavelength via a C/DWDM system as the channel transport system with an asymmetrical channel interface arrangement. One side of the IOF Channel is interfaced with FC-100 for interconnection with the first Local Channel. The other side of the IOF Channel is interfaced with OC-48. The FC-100 channel is first mapped into STS-1-19v and transported inside an OC-48 SONET payload over a 2.5 G wavelength via a C/DWDM system.

The second Local Channel also uses a 2.5 G wavelength via a C/DWDM system as the channel transport system with an asymmetrical channel interface arrangement. The CO Channel Interface is OC-48 whereas the Customer Channel Interface is FC-100.

Both the IOF Channel and the second Local Channel have 50% fill on their Channel Transport Systems. In other words, these two service components have enough capacity to carry additional traffic in the future.

Many variations exist. For instance, the first Local Channel can have the same configuration as the second Local Channel with OC-48 as the CO Channel Interfaces. The IOF Channel will then have a symmetrical channel interface arrangement with OC-48 on both sides.

This service is a full rate service where the Fibre Channel is transported at full rate across the systems. The channel is protected optically end-to-end with a diversely routed protection path. The channel is also protected against any nodal failure with dual homing and end-to-end channel protection. The following table summarizes the features of the service offering described in this example.

EXAMPLE # 3

Full Rate Fibre Channel Intra-Metropolitan Area Service

| Service Attributes | Service Component 1 | Service Component 2 | Service Component 3 |
|---|---|---|---|
| Channel Types | Local Channel | IOF Channel | Local Channel |
| Channel Interfaces | | | |
| Customer Channel Interface | FC-100 | n/a | FC-100 |
| CO Channel Interface | FC-100 | FC-100 and OC-48 | OC-48 |
| Interface Symmetry | Symmetrical | Asymmetrical | Asymmetrical |
| Channel Protection | | | |
| Protection Classes | Optically protected; deterministic | Optically protected; deterministic | Optically protected; deterministic |
| Protection Scope | | End-to-End Protection | |
| Homing | Dual Homing | n/a | Dual Homing |
| Route Diversity | | End-to-End Route Diversity | |
| Building Entrance | Separate Customer Entrances; Separate CO Entrances | Separate CO Entrances | Separate Customer Entrances; Separate CO Entrances |
| Channel Bandwidth | | | |
| Per Channel End-to-End | Full Rate Full Rate | Full Rate | Full Rate |

EXAMPLE # 3-continued

Full Rate Fibre Channel
Intra-Metropolitan Area Service

| Service Attributes | Service Component 1 | Service Component 2 | Service Component 3 |
|---|---|---|---|
| Channel Transport Systems | | | |
| Per Channel | 1.25 G λ CWDM | 2.5 G λ DWDM | 2.5 G λ DWDM |
| Channel Reach | | | |
| End-to-End | | Up to 300 miles | |

EXAMPLE 4

Full Rate Fibre Channel Intra-Metropolitan Area Service (b)

This service offering is almost identical to the previous one, except for the choice of Channel Transport System for the IOF Channel. In the previous example, the Channel Transport System is a 2.5 G wavelength via C/DWDM system whereas the Channel Transport System in this case is a STS-48 on OC-192 system.

From a network architecture point of view, the previous service offering relies on a shared DWDM core system to carry the IOF Channel. In this example, the service relies on a shared SONET core system to carry the IOF Channel. Customers can cascade multiple IOF Channels to further extend the service coverage. Only one IOF Channel is assumed in this example. The following table summarizes the features of the service offering described in this example.

EXAMPLE 5

Subrate Fibre Channel Intra-Metropolitan Area Service

This service, like the last two examples, is also an end-to-end intra-metropolitan area service where the two service demarcation points reside at the customer premises within the same metropolitan area. What sets this service offering apart from the other two is the fact that this is a subrate service whereas the other two are full rate service. Specifically, in this example there is a combination of channel transport systems and full rate/subrate components.

The Channel Transport System for Local Channel A is a 1.25 G wavelength over a C/DWDM system with FC-100 interfaces at both sides. The Fibre Channel is transported natively. Even though this 1.25 G Channel Transport System allows the FC-100 to burst at full rate in theory, the effective Channel Bandwidth is capped (in this example) at STS-1-5v because this is a subrate service.

EXAMPLE # 4

Full Rate Fibre Channel
Intra-Metropolitan Area Service

| Service Attributes | Service Component 1 | Service Component 2 | Service Component 3 |
|---|---|---|---|
| Channel Types | Local Channel | IOF Channel | Local Channel |
| Channel Interfaces | | | |
| Customer Channel Interface | FC-100 | n/a | FC-100 |
| CO Channel Interface | FC-100 | FC-100 and OC-48 | OC-48 |
| Interface Symmetry | Symmetrical | Asymmetrical | Asymmetrical |
| Channel Protection | | | |
| Protection Classes | Optically protected; deterministic | Optically protected; deterministic | Optically protected; deterministic |
| Protection Scope | | End-to-End Protection | |
| Homing | Dual Homing | n/a | Dual Homing |
| Route Diversity | | End-to-End Route Diversity | |
| Building Entrance | Separate Customer Entrances; Separate CO Entrances | Separate CO Entrances | Separate Customer Entrances; Separate CO Entrances |
| Channel Bandwidth | | | |
| Per Channel | Full Rate | Full Rate | Full Rate |
| End-to-End | Full Rate | | |
| Channel Transport Systems | | | |
| Per Channel | 1.25 G λ CWDM | STS-48 on OC-192 | 2.5 G λ DWDM |
| Channel Reach | | | |
| End-to-End | | Up to 300 miles | |

The Channel Transport System for the IOF Channel is STS-12 on an OC-192 SONET system. The CO Channel Interfaces are asymmetrical with FC-100 facing Local Channel (A) and OC-48 facing Local Channel (B).

In this example, the capacity offered by the Channel Transport System (STS-12) can be less than the line rates of the Channel Interfaces. The Channel Bandwidth (STS-1-5v in this example) can in turn be less than the capacity offered by the Channel Transport System. As far as actual implementation goes, the IOF Channel first maps FC-100 into STS-1-5v and carries it inside the STS-12 "trunk." It then hands off the traffic to the next hop via an OC-48 interface.

The Channel Transport System for the Local Channel (B) is a 2.5 G wavelength over a C/DWDM system with FC-100 interface as the Customer Channel Interface and OC-48 as the CO Channel Interface. The Fibre Channel is rate limited and mapped to STS-1-5v and carried over OC-48 on a 2.5 G wavelength via a C/DWDM system. The following table summarizes the features of the service offering described in this example.

used on portions of the resources to enable additional communication resources to be deployed at a later date over the same service components.

Figure 5:
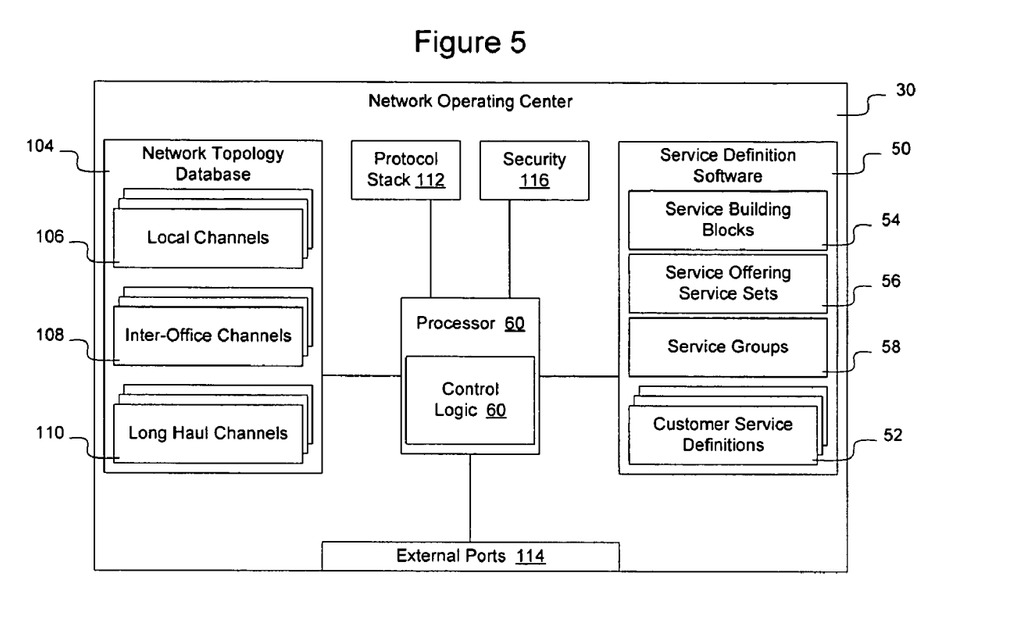
FIG. 5 is a functional block diagram of a network operating center including the service definition software platform of FIG. 4 according to an embodiment of the invention.

FIG. 5 illustrates an embodiment of a network element that may be configured to implement the network operating center 30 illustrated in FIGS. 1 and 2, and incorporating the service definition software platform 50 described above in greater detail above. Specifically, as shown in FIG. 5, the network operating service center includes a processor 100 containing control logic 102 configured to implement the functions ascribed to the network operating center described in greater detail above.

A service definition software platform 50 may be provided to enable the network operating center to define, and optionally implement, service definitions on the network. The service definition software may include service building blocks 52 and service offering service sets 54 as described in greater detail above. Additionally, the service definition software platform 50 may include service groups which are formed from groups of available service offerings. The

EXAMPLE # 5

Subrate Fibre Channel
Intra-Metropolitan Area Service

| Service Attributes | Service Component 1 | Service Component 2 | Service Component 3 |
|---|---|---|---|
| Channel Types | Local Channel | IOF Channel | Local Channel |
| Channel Interfaces | | | |
| Customer Channel Interface | FC-100 | n/a | FC-100 |
| CO Channel Interface | FC-100 | FC-100 and OC-48 | OC-48 |
| Interface Symmetry | Symmetrical | Asymmetrical | Asymmetrical |
| Channel Protection | | | |
| Protection Classes | Optically protected; deterministic | Optically protected; deterministic | Optically protected; deterministic |
| Protection Scope | | End-to-End Protection | |
| Homing | Dual Homing | n/a | Dual Homing |
| Route Diversity | | End-to-End Route Diversity | |
| Building Entrance | Separate Customer Entrances; Separate CO Entrances | Separate CO Entrances | Separate Customer Entrances; Separate CO Entrances |
| Channel Bandwidth | | | |
| Per Channel | Full Rate | Subrate | Subrate |
| Subrate Bandwidth | n/a | STS-1-5v | STS-1-5v |
| End-to-End | Subrate at STS-1-5v | | |
| Channel Transport Systems | | | |
| Per Channel | 1.25 G λ DWDM | STS-12 on OC-192 | 2.5 G λ DWDM |
| Channel Reach | | | |
| End-to-End | | Up to 300 miles | |

FIG. 4 illustrates the optical broadband service illustrated in FIG. 2 in greater detail. As shown in FIG. 2, the optical broadband service is configured to provide 3 Gigabit Ethernet (GE) channels and two Fibre Channel (FC) channels between site 1 and the several remote sites. Specifically, in this example, a GE channel is to be provisioned between Site 1 and site 2, two GE channels and a FC channel are to be provisioned between site 1 and site 4, and a FC channel is to be provided between site 1 and site 3. By defining the channel attributes at each stage the service definition software platform enables the several channels to be carried on an OC-48 over local channel 22, allows the channels to share an OC-192 connection on the IOF channel 24, and also allows the particular bandwidths and channel transport systems to be specified. This allows sub-rate transports to be service definition software platform 50 may also include customer service definitions which are services provided and defined for particular customers or subscribers. Optionally, the customer service definitions may be maintained in a separate database available to the service definition software or to the network operating center processor 100.

A network topology database 104 may be available to the network operating center. The network topology database may be native or interfaced to the network operating center and may contain information about the network on which services are to be defined for customers. Providing the network operating center enables the network operating center, in connection with the service definition software platform, to ascertain which network services are available on particular links and to create service offering service sets for those particular network links. The network topology database 104 may include information about local channels 106, interoffice channels 108, and long haul channels 110. Optionally, where the service definitions software platform is a distributed application and configured to run on particular domains or in particular areas of the network, the network topology database may be circumscribed as well to contain information pertinent to the particular region of the network that will be handled by the particular network operating center or service definition software platform.

The network operating center 30 may also include one or more additional modules to facilitate interactions on the network. For example, the network operating center 30 may include a protocol stack 112 to enable it to take action on the network and otherwise engage in protocol exchanges on the network. For example, where the network operating center is configured to interface with the network elements to establish the services defined by the service definition software platform, the protocol stack may contain data and instructions to enable the network operating center to interface with the network elements using a network management protocol. The network operating center may also include external ports 114 to enable it to be connected to the network elements over a dedicated management network or over the data network. Optionally, a security module 116 may be provided to prevent the network operating center from being controlled by unauthorized or unauthenticated individuals or machines.

The control logic 102 may be implemented as a set of program instructions that are stored in a computer readable memory within the network element and executed on a microprocessor, such as processor 100. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer readable medium containing instructions for controlling at least one processor to perform a method of defining an optical broadband service in an optical communication network, the optical broadband service being a circuit-based service that allows bandwidth on the optical communication network to be reserved and dedicated to a customer, the method comprising the steps of:

selecting at least one service component to be included in the optical broadband service, the service component being capable of carrying one or more service channels; and defining a service channel to be carried by the service component, the service channel definition including at least a service type attribute for the service channel, a service channel interface attribute for the service channel, a service channel bandwidth attribute for the service channel, and a service channel transport system attribute for the service channel.

2. The computer readable medium of claim 1, wherein the service type attribute of the service channel indicates whether the service component is a local channel, an InterOffice Facility channel, or a long haul channel.

3. The computer readable medium of claim 2, wherein the step of selecting at least one service component comprises selecting multiple service components, each of which forms a segment of a path through the network that will carry the optical broadband service.

4. The computer readable medium of claim 3, wherein each segment has its own service type attribute.

5. The computer readable medium of claim 1, wherein the service component is a local channel, the local channel being a point-to-point broadband channel between a customer location and a service provider's wire center or central office.

6. The computer readable medium of claim 1, wherein the service component is an InterOffice Facility (IOF) channel, the IOF channel providing a point-to-point broadband channel between two wire centers within a metro area.

7. The computer readable medium of claim 6 wherein the IOF channel has ends comprising optical system handoff points.

8. The computer readable medium of claim 1, wherein the service component is a long haul channel comprising one or more links that collectively define a channel between two metropolitan areas.

9. The computer readable medium of claim 1, wherein each service component is capable of carrying multiple service channels, and wherein not all of the service channels carried by a particular service component are required to be associated with the same service offering.

10. The computer readable medium of claim 1, wherein the service channel interface attribute for the service channel specifies a protocol and a line rate of the service channel on the service component.

11. The computer readable medium of claim 10, wherein the service channel interface attribute comprises an indication as to whether the service channel has symmetrical or asymmetrical interfaces.

12. The computer readable medium of claim 10, wherein the service channel bandwidth attribute for the service channel specifies an actual throughput of the service channel, the service channel bandwidth being equal to or less than the line rate of the channel interface attribute.

13. The computer readable medium of claim 1, wherein the service channel transport system attribute for the service channel specifies an actual network implementation of a link on the optical communication network forming the service component.

14. The computer readable medium of claim 1, wherein the service channel definition includes a channel protection attribute.

15. The computer readable medium of claim 14, wherein the channel protection attribute for the service attribute specifies at least one of protection class, protection scope, multi-homing vs. single homing, route diversity, and building entrance diversity.

16. The computer readable medium of claim 1, wherein the service channel includes service demarcation points, and wherein the service definition further includes a channel reach attribute for the service channel, the channel reach attribute specifying how far apart two of the service demarcation points may be placed.

17. The computer readable medium of claim 1, wherein the service components are actual links on the optical communication network that are to be assigned to the optical broadband service, the link being selectable from a network topology database.

\* \* \* \* \*